US006586747B1

(12) United States Patent
Erdman

(10) Patent No.: US 6,586,747 B1
(45) Date of Patent: Jul. 1, 2003

(54) PARTICLE ACCELERATOR ASSEMBLY WITH LIQUID-TARGET HOLDER

(75) Inventor: Karl Lembit Erdman, Vancouver (CA)

(73) Assignee: Ebco Industries, Ltd., Richmond (CA)

( * ) Notice: Subject to any disclaimer, the term of this patent is extended or adjusted under 35 U.S.C. 154(b) by 536 days.

(21) Appl. No.: 09/602,755

(22) Filed: Jun. 23, 2000

(51) Int. Cl.[7] .......................... G01N 21/24; G21G 1/00; G21G 4/00

(52) U.S. Cl. .................... 250/432; 250/428; 250/494.1; 250/492.1; 376/156; 376/190; 376/194; 376/195; 376/202

(58) Field of Search ................................ 250/428, 432, 250/492.1, 492.2, 494.1; 376/156, 190, 194, 195, 202

(56) References Cited

U.S. PATENT DOCUMENTS

| | | | | |
|---|---|---|---|---|
| 4,201,917 A | * | 5/1980 | Graentzel | 250/431 |
| 4,767,333 A | | 8/1988 | Born | |
| 5,019,323 A | | 5/1991 | Lambrecht et al. | |
| 5,280,505 A | * | 1/1994 | Hughey et al. | 376/156 |
| 5,371,372 A | * | 12/1994 | Phillips | 250/432 PD |
| 5,393,908 A | | 2/1995 | Satyamurthy et al. | |

* cited by examiner

*Primary Examiner*—John R. Lee
*Assistant Examiner*—David A. Vanore
(74) *Attorney, Agent, or Firm*—Perkins Coie LLP

(57) ABSTRACT

A particle accelerator assembly with a liquid-target holding assembly usable to produce radioisotopes in liquid targets. A particle accelerator is configured to produce a particle beam along a beam axis, and the liquid-target holding assembly connected to the particle accelerator. The liquid-target retaining assembly has a mounting portion coupled to the particle accelerator, and the mounting portion is configured to receive the particle beam therethrough. A liquid-target holder is connected to the mounting portion and has a holder body with a target cavity that contains a liquid target therein. The target cavity has a longitudinal axis oriented at an acute angle relative to the particle beam axis. The target cavity has a first depth along an axis perpendicular to the longitudinal axis and has a projected depth along the beam axis greater than the first depth. The holder body is a chemically inert material unreactive to the liquid target, the produced radioisotopes, or reaction byproducts from the irradiation of the liquid target therein.

34 Claims, 3 Drawing Sheets

PARTICLE ACCELERATOR ASSEMBLY WITH LIQUID-TARGET HOLDER

TECHNICAL FIELD

The present invention is directed to components for particle accelerator assemblies, and more particularly, to liquid-target holder assemblies on particle accelerators assemblies used to produce selected radioisotopes.

BACKGROUND

Biologically active radiochemicals containing short-life isotopes have been utilized for medical research as well as for therapeutic and diagnostic procedures. The radiochemicals have achieved very good results. The radiochemicals are produced by synthesizing radioisotopes created by irradiating small targets with a particle beam from a cyclotron or other particle accelerator. The biologically active radiochemicals have relatively short useful lives, so the radiochemicals must be produced at or very close to the location in which they are to be used, such as a hospital or lab. Locally producing the radiochemicals has not been economically feasible or practical for most hospitals or labs.

The radioisotopes can be produced using accelerators that generate high-energy particle beams or low-energy particle beams. High-energy accelerators, such as the Ebco TR30, which produces a proton beam with a current up to 2.0 mA and energies variable between 15–30 MeV, are very large and expensive. Accordingly, it is often not economically feasible for hospitals and labs to have such equipment on site. Lower energy accelerators, such as the Ebco TR19 series which produce proton beams with currents between 100 $\mu$A and 2.0 mA and energies variable between 12 MeV-19 MeV, are smaller and less expensive.

It is highly desirable to produce the radiochemicals, such as fluorodeoxyglucose (FDG), from liquid targets with low energy accelerators in an economical manner in sufficient volumes for use as needed by the hospital or lab. The low energy accelerators, however, are more susceptible to several factors that limit the ability to effectively and economically produce the necessary volumes of the radioisotopes for the synthesis of the radiochemicals. These factors include the cost of the liquid targets used to form the radiochemicals and the amount of the radiochemicals needed per dose for the medical research, therapeutic, or diagnostic procedure. In order to achieve high purity and high specific activity, the target material is made of separated isotopes, which are very expensive, and the target volume should be kept as small as possible to reduce the cost of production. The volume of the radiochemical typically needed per dose is typically very small, so large amounts of the radiochemicals do not need to be produced at once. In fact, producing large volumes of the radiochemicals can result in waste if the chemical is not all used within its short useful life.

Other factors effecting production of radioisotopes from liquid targets with low energy accelerators include the configuration of the holding assemblies that retain the liquid target during the irradiation process. The holding assemblies must withstand severe environments created during the irradiation process and also enable the production of contaminant-free radiochemicals. When the liquid target is irradiated, the proton beam quickly heats the liquid target and creates high pressure within the target holder. The target holder must be capable of withstanding the elevated pressures without rupturing and without removing too much energy from the proton beam. Conventional liquid target holders have a thin front window through which the proton beams must pass before hitting the liquid target. Thicker windows are desirable to withstand the pressures generated from heating the liquid, but the thicker windows provide more mass through which the proton beam must pass before reaching the target. Accordingly, the thicker windows absorb more beam energy, thereby decreasing the effectiveness of the proton beam. When a low energy beam is used, it is highly desirable to ensure that as much energy remains in the proton beam as possible by the time it reaches its liquid target to maximize the beam's efficiency for irradiating the liquid target. So, while the strength of the thick window is desired, the resulting engergy decrease in the beam is not.

Another factor includes providing a liquid target that will fully absorb the remaining energy of the proton beam. As the proton beam is passed into the target holder and the liquid target, the liquid target must have a sufficient depth or thickness so as to fully absorb the particles from the beam. If the proton beam passed completely through the liquid target and the target holder, the particle beam could create a radioactive environment external to the holding assembly.

Another significant factor in forming the radioisotopes or radiochemicals is controlling the liquid target's temperature during the irradiation process. When the proton beam bombards the liquid target, the temperature of the target quickly increases. Heat must be efficiently drawn from the liquid target to prevent boiling or formation of bubbles within the liquid target. It is noted that bubbles are voids, having substantially less mass through which the proton beam must pass. Thus, boiling the liquid target creates a very undesirable condition that can result in the beam passing through the liquid target and the target holding assembly, which could result in a radioactive environment around the particle accelerator.

The quantity of radioisotopes produced in a liquid target is very small (e.g., an isotope concentration in the target may be in the order of $1\times10^{12}$), so it is important that the target body not introduce contaminants into the target material. Such contaminants would reduce the quantity of the available useful radioisotopes, and hinder the subsequent chemical processes in incorporating the radioisotope into the desired radiochemical.

Removal of the heat generated in the target is a significant problem that limits the magnitude of the incoming beam's current and hence, the production rate. Higher production rates are achieved if beams with higher currents can be used. Prior art target holders have been made of silver, which has a high thermal conductivity that allows heat to be quickly drawn from the liquid target. The silver target holders, however, often have impurities within the metal that can react with the proton beam to create a contaminant to the liquid target and the radiochemical formed in the target holder. At high currents, such as 40–50 $\mu$A, the silver target holders are typically only usable for one or two runs to create radioisotopes such as Flourine-18 before being too contaminated for further use to maintain sufficiently pure radiochemicals. At lower currents, such as 20–25 $\mu$A, the silver target holder can be used for a few runs before the holder must either be replaced or cleaned. Other materials with low thermal efficiencies but better resistance to contamination have not been suitable for use as liquid-target holding assemblies for low energy accelerators. Accordingly, the silver target holders are used despite this susceptibility to contamination because of silver's extremely high thermal conductivity.

SUMMARY OF THE INVENTION

The present invention provides an assembly with a liquid-target holder that overcomes the above and other problems experienced in the prior art. One embodiment of the invention provides a particle accelerator assembly having a liquid-target holding assembly for retaining the liquid target in a selected orientation for irradiation by a particle beam projected along a beam axis. The liquid-target holding assembly includes a mounting portion coupled to the particle accelerator and configured to receive the particle beam moving along the beam axis. A liquid-target holder is connected to the mounting portion and has a holder body with a target cavity therein sized to contain the selected liquid target. The target cavity has a longitudinal axis oriented at an acute angle relative to the beam axis. The target cavity has a first depth along an axis perpendicular to the longitudinal axis of the target cavity, and has a projected depth along the beam axis greater than the cavity's first depth. The holder body is a a chemically inert material unreactive with the selected liquid target, the resulting radioisotopes, or any reaction byproducts created upon irradiation of the liquid target. In one embodiment, the liquid-target holder is made of niobium, which is chemically inert with, inter alia, Oxygen 18, Oxygen-15, Nitrogen 13,Carbon 11, Flourine-18, and reaction by-products from the irradiation to create these radioisotopes.

In one embodiment, the mounting portion has a mounting surface oriented at an acute angle in the range of approximately 10° to 50°, inclusive, relative to the beam axis. The liquid-target holder is removably attached to the mounting surface such that the target cavity's longitudinal axis is oriented at an acute angle in the range of approximately 10° to 50° inclusive, relative to the beam axis. The liquid-target holder of one embodiment includes a front window removably connected to the holder body, and a rear window integrally connected to the holder body. A cooling block is connected to the holder and configured to support the rear window and to direct cooling fluid against the rear window, thereby drawing heat away from the rear window and facilitating cooling of the liquid target during the irradiation process.

DETAILED DESCRIPTION OF THE INVENTION

In the following detailed description, certain specific details are set forth in order to provide a thorough understanding of various embodiments of the invention. However, one skilled in the art will understand that the invention may be practiced without these specific details. In other instances, well-known structures associated with particle accelerators have not been shown or described in detail to avoid unnecessarily obscuring the description of the embodiments of the invention.

Figure 1:
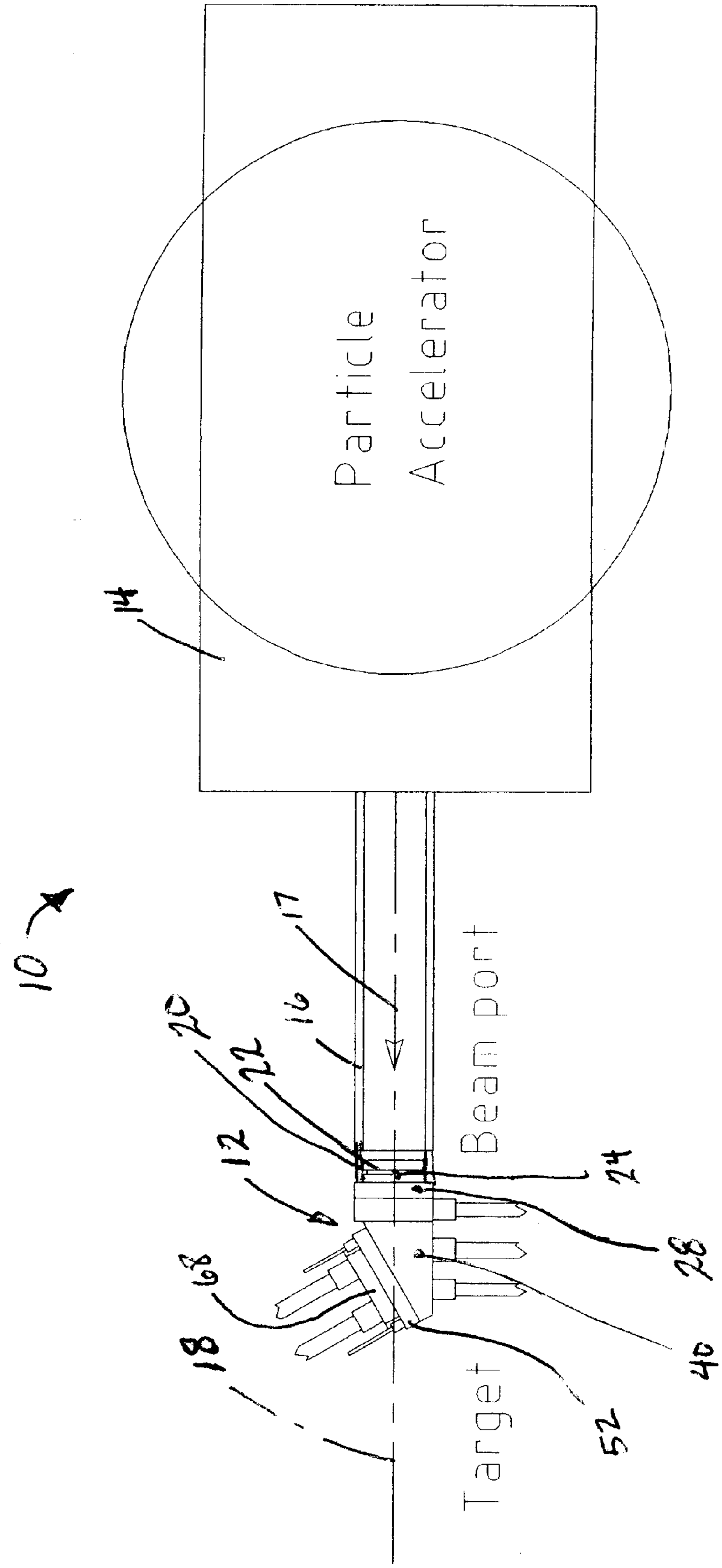
FIG. 1 is a schematic representation of a particle accelerator assembly with a liquid-target holding assembly in accordance with an embodiment of the present invention.

A particle accelerator assembly 10 having a liquid-target holding assembly 12 in accordance with one embodiment of the present invention is illustrated in the figures. As best seen in FIG. 1, the particle accelerator assembly 10 includes a cyclotron 14 that directs a proton beam 17 along a beam axis 18, through an output portion 16, and to the liquid-target holding assembly 12. The liquid-target holding assembly 12 retains a liquid target in a selected geometric orientation relative to the beam axis 18 for irradiation by the proton beam 17 to create selected radioisotopes.

In one embodiment, the cyclotron 14 is a negative ion cyclotron, such as a TR19 Cyclotron produced by Ebco Technologies of Richmond, British Columbia, Canada. The TR19 Cyclotron is a low energy accelerator that produces a proton beam with a current of up to 100$\mu$A and energies available between 13–19 MeV. Other low energy cyclotrons available from Ebco Technologies provide proton beams with currents in excess of 2 mA on target, which can be ideal for product on of bracchiotherapy radioisotopes, such as Palladium 103 as well as many of the SPECT radioisotopes. The Ebco Cyclotrons are also suitable for use with targetry and radiochemical synthesis systems for the product of radioisotopes such as Carbon-11, Nitrogen-13, Oxygen-15, and Fluorene-18, and selected positron emitting radiochemicals, such as fluorodexyglucose (FDG).

Figure 2:
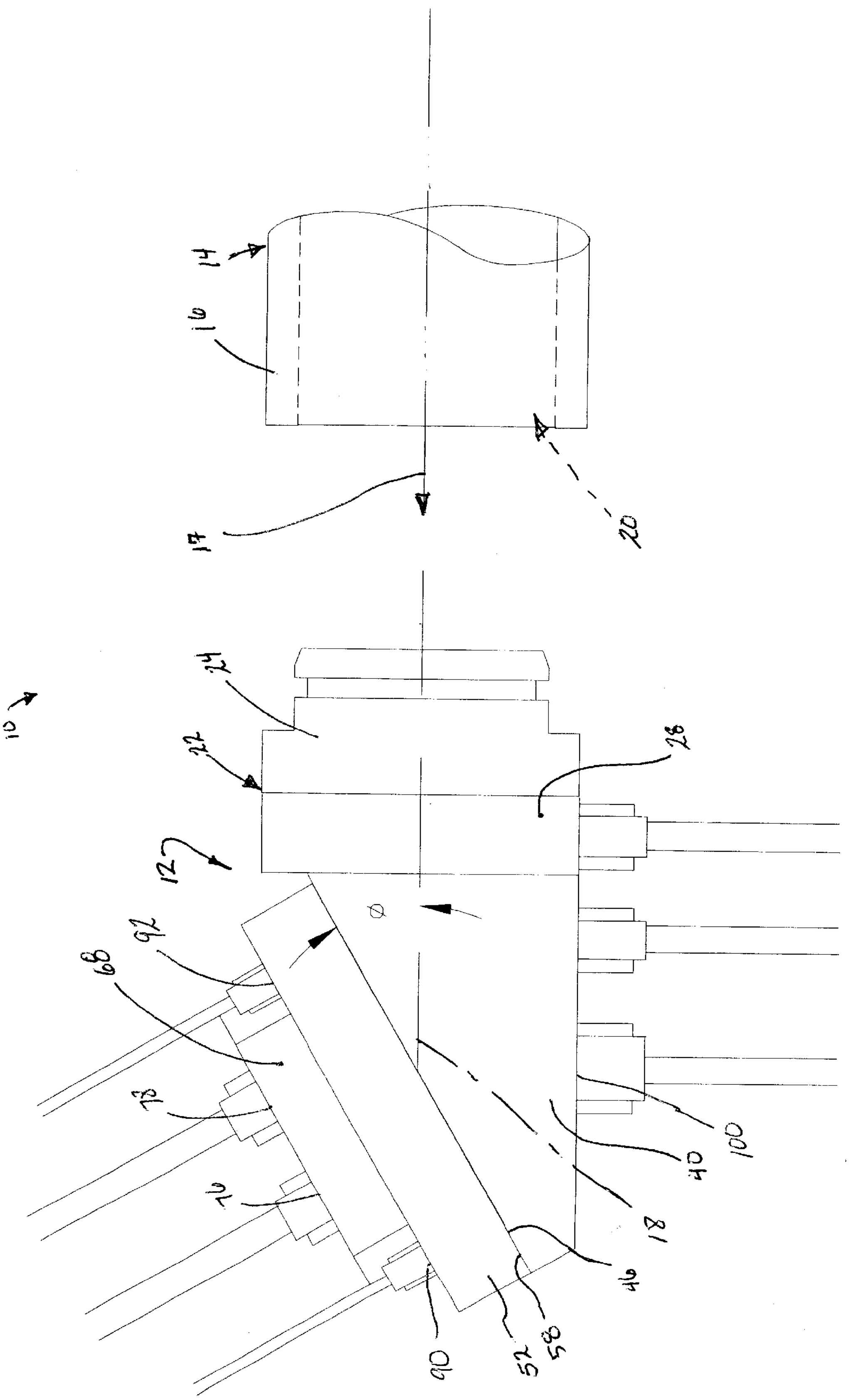
FIG. 2 is an enlarged side elevation view of the liquid-target holding assembly of FIG. 1.
Figure 3:
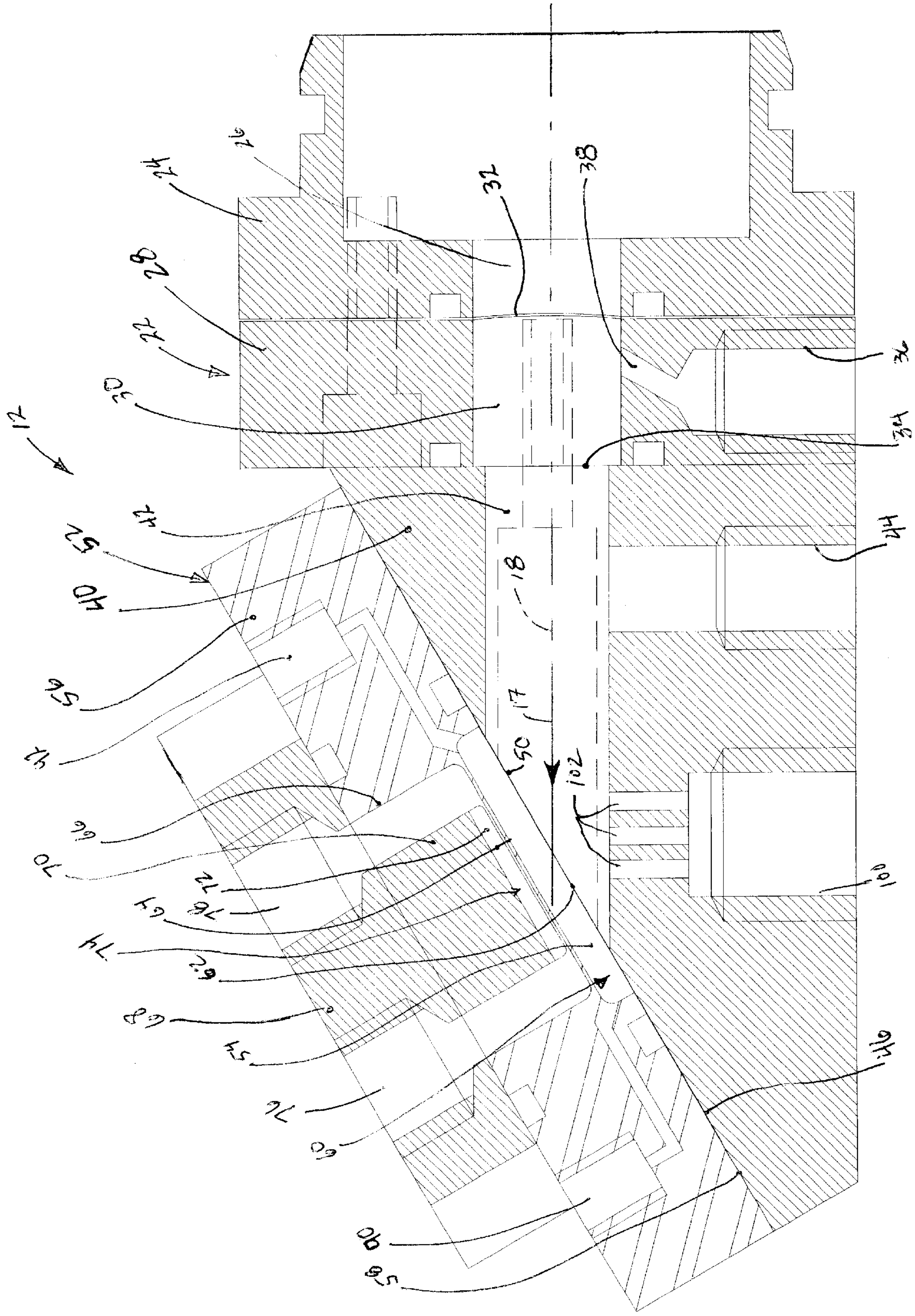
FIG. 3 is a cross-sectional view of the liquid-target holding assembly taken substantially along line 3—3 of FIG. 2.

As best seen in FIG. 2, the cyclotron's output portion 16 has a receiving portion 20 that removably receives the liquid-target holding assembly 12 in alignment with the beam axis 18. The liquid-target holding assembly 12 includes a mounting portion 22 that removably connects to the cyclotron's output portion 16 in a quick disconnect manner and extends at least partially into the output portion's receiving area 20. In the illustrated embodiment, the mounting portion 22 includes a connector flange 24 removably connected to the accelerator's output portion 16. The connector flange 24 has an interior bore 26 in axial alignment with the beam axis 18.

The mounting portion 22 includes an intermediate flange 28 securely fastened to the connector flange 24 such that an interior bore 30 in the intermediate flange is axially aligned with the connector flange's interior bore 26 and also with the beam axis 18. In the illustrated embodiment, the intermediate flange 28 has a vacuum window 32 separating the connector flange's bore 26 from the intermediate flange's interior bore 30. The intermediate flange's bore 30 forms a proximal portion of a cooling chamber 34 within the mounting portion 22. The intermediate flange 28 includes an inlet port 36 with an outlet nozzle 38 directed toward the vacuum window 32. The inlet port 36 is connectable to a source of cooling fluid, such as helium or the like and the outlet nozzle directs the helium against the vacuum window 32 to keep the vacuum window cool as the proton beam 17 moves through it into the cooling chamber 34.

The intermediate flange 28 is securely fastened to an adapter flange 40, such that the intermediate flange is sandwiched between the adapter flange and the connector flange 24. The adapter flange 40 has an interior bore 42 in axial alignment with the intermediate flange's bore 30 so as to form the cooling chamber 34 within the mounting portion 22. The adapter flange 40 includes a port 44 in fluid communication with the cooling chamber 34 and usable to direct a coolant fluid, such as helium, argon, or hydrogen gas into the the cooling chamber 34. The coolant fluid is selected so as to minmize the material through which the proton beam 17 must pass as the beam moves through the liquid-target holding assembly 12.

The adapter flange 40 has an angled mounting surface 46 that defines a plane oriented at an acute angle relative to the beam axis 18. In the illustrated embodiment, the mounting surface 46 is oriented at approximately 30° relative to the beam axis 18. In alternate embodiments, the mounting surface 46 is oriented at an acute angle in the range of approximately 20° to 40°, inclusive, and in other embodiments, at an acute angle in the range of approximately 10° to 50°, inclusive. The interior bore 42 in the adapter flange 40 extends through the mounting surface 46 and forms an oval-shaped beam aperture 50 in the mounting surface 46 aligned with the beam axis 18 and through which the proton beam 17 passes during an irradiation run.

The connector flange 24, intermediate flange 28 and adapter flange 40 of the illustrated embodiment are aluminum components securely held together by threaded fasteners. Alternate embodiments of the mounting portion 22 can be made of other selected materials suitable for use with a cyclotron, and other mechanisms can be used to retain the flanges together.

The adapter flange 40 removably receives a liquid-target holder 52 on the angled mounting surface 46. The liquid target holder 52 is positioned over the beam aperture 50 so a liquid target 54 within the holder is in alignment with the beam axis 18 and will be bombarded by the proton beam 17 during an irradiation run. The liquid-target holder 52 of the illustrated embodiment includes a holder body 56 having a flat engagement surface 58 that mounts flush against the adapter flange's mounting surface 46. The holder body 56 includes a target cavity 60 formed therein and sized to contain a selected volume of liquid target, such as water with Oxygen-18 to be irradiated by the proton beam 17 for production of Flourine-18 used in the synthesis offluordeoxyglucose (FDG).

The target cavity 60 is enclosed on its front side by a thin front window 62 removably mounted to the holder body's mounting surface 58. The thin front window 62 extends across the target cavity and covers the beam aperture 50 in the angled mounting surface. Thus, the front window 62 blocks the liquid target from flowing into the adapter flange's bore 42.

In the illustrated embodiment, the front window 62 is an inert Havar window having a thickness of approximately 0.001 inches. The Havar front window 62 provides a sufficiently thin barrier through which the particle beam passes before bombarding the liquid target 54, and the thin barrier does not absorb too much of the particle beam before reaching the liquid target. The thin Havar window 62 has sufficient thickness and tensile strength to withstand the high pressures created within the target cavity 60 as the particle beam bombards and heats the liquid target 54. While the illustrated embodiment utilizes a front window made of 0.001 inch Havar, other selected materials or thicknesses can be used that allow the particle beam to pass therethrough without excessively absorbing the particle beam while maintaining the necessary strength to prevent the front window from rupturing. The liquid-target holder 52 also includes a rear window 64 defining the distal or rear portion of the target cavity 60. In the illustrated embodiment, the holder body 56 has an enlarged receiving aperture 66 formed in the body's backside in a position so the rear window 64 is the only structure that separates the receiving aperture from the target cavity 60. The rear window 64 of this embodiment is integrally formed in the holder body 56. In this embodiment, the holder body 56 is made of niobium or another chemically inert material, and the target cavity 60 is machined into the front side of the holder body and the receiving aperture is machined in the rear side of the holder body, so the material remaining therebetween is the thin rear window 64. In this illustrated embodiment, the rear window 64 is formed by a 0.01 inch thick layer of the niobium oriented at the acute angle relative to the beam axis 18. This angled orientation of the rear window 64 relative to the beam axis results in a greater surface area from which heat can be drawn away from the liquid target, as discussed in greater detail below. The thin rear window is also designed to provide sufficient strength to withstand the pressures the target cavity 60 during the irradiation process.

The holder body 56 includes a target filling port 90 in fluid communication with the target cavity 60, and a fluid emptying port 92 also in fluid communication with the target cavity 60. The filling port 90 allows the liquid target to be deposited into the target cavity 60 before the irradiation process. The emptying port 92 allows the liquid target and radioisotopes to be removed from the target cavity after the irradiation process.

The niobium holder body 56 and the rear window 64 of the illustrated embodiment are chemically inert to the liquid targets (e.g. water with Oxygen-18), the resulting radioisotopes (e.g. Flourine), and the reaction byproducts formed during the irradiation process. In alternate embodiments, the holder body 56 can be made from any chemically inert material for the selected liquid target, the radioisotope to be created, and any reaction by-products from that isotope. As a result, the chemically inert holder body 56 can be used over and over again through multiple runs at high currents without becoming contaminated or contaminating the irradiated liquid target. While the niobium holder body 56 of the illustrated embodiment is not as thermally conductive as silver, but the niobium's chemically inert properties are superior to those of silver for the irradiation environment. The geometric configuration and orientation of the holder body 56 and the cooling block 68, as discussed in greater detail below, provides for sufficient cooling of the liquid target during the irradiation run for effective use of the niobium body.

In the illustrated embodiment, the front and rear windows 62 and 64 are spaced apart by a first distance, such as 3 mm, to define the depth of the target cavity 60 and, thus, the thickness of the liquid target 54. This thickness of the liquid target 54 would be insufficient to fully absorb the proton beam 17 if the beam axis 18 were perpendicular to the front window 62. The holder body 56 and target cavity 60 are oriented such that a longitudinal axis 70 of the target cavity 60 is at an acute angle relative to the beam axis 18. As a result, the projected depth of the target cavity 60, and thus the projected thickness of the liquid target 54 along the beam axis 18, is greater than the first thickness between the front and rear windows 62 and 64 along an axis normal to the windows. In the illustrated embodiment, the acute angle is approximately 30° relative to the beam axis, so the target cavity's projected depth and the liquid target's projected thickness is approximately 6 mm. This projected depth of the liquid target 54 is sufficient to fully absorb the proton beam 18. Accordingly, the projected thickness of the liquid target 54 allows a higher energy beam to be used to irradiate the liquid target than if the beam axis 18 were normal to the liquid target, thereby allowing for increased productivity of isotopes.

While the illustrated embodiment has an acute angle of approximately 30°, other embodiments provide an acute angle in the range of approximately 20° to 40°, inclusive. In other embodiments, the acute angle is in the range of approximately 10° to 50°, inclusive. Shallower angles can be used, although as the angle gets shallower or smaller, the length of the target cavity 60 may increase, thereby increasing the volume of the target cavity. This larger volume of the target cavity 60 may require more initial liquid target material, which as identified above is expensive, so as to become economically undesirable. It is also noted that the rear window 64 must be of a suitable size with enough surface area to allow enough heat to be conducted away from the liquid target 54 during the irradiation process.

In the illustrated embodiment with the selected cyclotron and liquid targets, the proper balance between the target's projected thickness, the actual thickness, the target volume, the rear window size, and the heat convection away from the rear window and liquid target is achieved when the target holder is oriented at 30°. When the angle is approximately 30°, the power density of the proton beam 17 in the liquid target 54 is decreased by a factor of two, and the orientation allows for an enlarged surface area at the rear window to achieve greater heat distribution to allow the heat to be drawn away from the rear window and the liquid target by convection.

Convection of the heat from the rear window 64 is achieved by passing cooling fluid through the cooling block and over the rear window. The cooling block 68 is mounted to the holder body 56, and a support portion 70 of the cooling block 68 extends into the receiving aperture 66 in the holder body. In the illustrated embodiment, the cooling block 68 is aluminum, although other suitable materials can be used in alternate embodiments. The support portion 70 includes a plurality of elongated parallel support ribs 72 spaced apart from each other. The support ribs 72 are positioned to engage the rear window 64 and provide additional support to the back of the rear window so as to resist the pressures generated within the target cavity 60 during the irradiation process. These support ribs 72 allow the rear window 64 to be thinner, thereby improving its heat conductivity and facilitating cooling of the liquid target during the irradiation process.

The support ribs 72 are spaced apart from each other so as to form at least one cooling channel 74 adjacent to the thin rear window 64. In the illustrated embodiment, the support portion 70 has three parallel support ribs 72, thereby forming five parallel cooling channels 74, although other cooling channel configurations can be used in alternate embodiments. The support ribs 72 on the cooling block 68 provide enough support to the thin rear window 64 to prevent the window from rupturing from the elevated vapor pressures in the target cavity 60.

The cooling block 68 has a cooling fluid inlet port 76 and an outlet port 78 in fluid communication with the cooling channels 74. The inlet and outlet ports 76 and 78 are connected to a source of cooling fluid that provides a flow of cooling fluid into the cooling block, through the cooling channels 74 across the rear window 64 and out the outlet port 78. The cooling fluid passes over the thin rear window 64, the cooling fluid draws the heat away from the thin rear window 64 and, thus, from the liquid target 54.

In the illustrated embodiment, some additional cooling of the liquid target 54 is achieved by cooling the front window 62. The adapter flange 40 has a cooling port 100 therein with nozzles 102 directed to the front window 62. The cooling port 100 is coupleable to a source of cooling fluid, and the nozzles 102 direct the cooling fluid onto the front window 62, thereby cooling the front window and the liquid target 54 as the proton beam 17 passes through the front window into the liquid target. In the illustrated embodiment, the cooling fluid is helium, and alternate embodiments can use other cooling fluids to achieve the desired cooling of the components.

The illustrated embodiment allows for isotopes to be formed from a liquid target in an efficient and effective manner with a low energy accelerator. The process includes providing the liquid target in the target cavity at the angular orientation relative to the beam axis to form an acute angle The proton beam is passed along the beam axis into the target body through an effective thickness of the liquid target that is greater than the liquid target's thickness normal to the target cavity's longitudinal axis. This allows for, among other things, the utilization of less liquid target to produce the selected radioisotopes, and provides for an increased power distribution within the liquid target. The increased power distribution of the illustrated embodiment decreases the heat deposited to the rear window by a factor of five, thereby greatly improving heat transfer by convection. The inert niobium target holder is usable over and over again through multiple runs without contamination. The configuration also allows for formation of the radioisotopes utilizing a low energy particle is accelerator, which is less expensive and more economically feasible for hospitals and labs.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to high-energy particle accelerators, and not necessarily limited to the exemplary low energy particle accelerators generally described above. Further, the teachings provided herein can be applied to other suitable materials and thicknesses, not necessarily the exemplary materials and thicknesses as described above for the components.

These and other changes can be made to the invention in light of the above detailed description. In general, in the following claims, the terms used should not be construed to limit the invention to the specific embodiments disclosed in the specification and the claims, but should be construed to include all particle accelerators and liquid-target holders that operate in accordance with the claims to provide the particle accelerator assembly, the liquid holding assembly, and the methods of manufacturing the isotopes. Accordingly, the invention is not limited by the disclosure, but instead its scope is to be determined entirely by the following claims.

What is claimed is:

1. A liquid-target holding assembly for use with a particle accelerator and a liquid target to form a radioisotope, the particle accelerator provides a particle beam along a beam axis, comprising:

a mounting portion attachable to the particle accelerator, the mounting portion having a portion configured to receive the particle beam therethrough; and a liquid-target holder connected to the mounting portion, the liquid-target holder having a holder body with a target cavity therein sized to contain the selected liquid target therein, the target cavity having a longitudinal axis oriented at an acute angle relative to the particle beam, the target cavity having a first depth along an axis perpendicular to the longitudinal axis, and having a projected depth along the beam axis greater than the first depth, the holder body being a chemically inert material unreactive with the liquid target, the radioisotope, or a reaction byproduct from the irradiation of the liquid target.

2. The liquid-target holding assembly of claim 1 wherein the liquid-target retaining assembly further includes a cooling block removably mounted to the liquid-target holder and positioned to allow heat to be drawn away from the liquid target and the holder body.

3. The liquid-target holding assembly of claim 1 wherein the liquid-target holder includes first and second windows defining opposing sides of the target cavity, the first and second windows being spaced apart from each other by a distance corresponding to the first depth.

4. The liquid-target holding assembly of claim 1 wherein the first and second windows are oriented at the acute angle relative to the beam axis.

5. The liquid-target holding assembly of claim 1 wherein the first window is removably connected to the holder body.

6. The liquid-target holding assembly of claim 1 wherein the second window is integrally formed in the holder body.

7. The liquid-target holding assembly of claim 1 wherein the liquid-target retaining assembly further includes a window support structure mounted to the liquid-target holder to support the second window.

8. The liquid-target holding assembly of claim 1 wherein the mounting portion includes a mounting surface oriented at the acute angle relative to the beam axis, and the liquid-target holder is mounted to the mounting surface.

9. The liquid-target holding assembly of claim 1 wherein the liquid-target holder is fastened to the mounting portion with a plurality of fasteners.

10. A particle accelerator assembly usable to produce a radioisotope from a liquid target, comprising:

a cyclotron having an output portion positioned to allow a particle beam to move therethrough along a beam axis;

a liquid-target retaining assembly attached to the cyclotron, the liquid-target retaining assembly having:

a mounting portion connected to the particle accelerator's output portion, the mounting portion having a beam channel therethrough positioned in alignment with the beam axis and to receive the particle beam therethrough, the mounting portion having a mounting surface oriented at an acute angle relative to the beam axis; and a liquid-target holder mounted to the mounting surface of the mounting portion, the liquid-target holder having a holder body with an elongated target cavity therein sized to contain the liquid target, the target cavity having a longitudinal axis oriented at the acute angle relative to the particle beam, the target cavity having a first depth along an axis perpendicular to the longitudinal axis, and having a projected depth along the beam axis greater than the first depth, the holder body being a chemically inert material unreactive with the liquid target, the radioisotope, or a reaction byproduct from the irradiation of the liquid target.

11. The particle accelerator assembly of claim 10 wherein the liquid-target retaining assembly further includes a cooling block coupleable to a source of coolant and mounted to the liquid-target holder, the cooling block being positioned to direct a flow of the coolant over a portion of the holder body to draw heat away from the holder body during the irradiation process.

12. The particle accelerator assembly of claim 10 wherein the liquid-target retaining assembly further includes a cooling block removably mounted to the liquid-target holder and positioned to draw heat away from the holder body.

13. The particle accelerator assembly of claim 10 wherein the liquid-target holder includes first and second windows defining opposing sides of the target cavity, the first and second windows being spaced apart from each other by a distance corresponding to the first depth.

14. The particle accelerator assembly of claim 13 wherein the first and second windows are substantially parallel to each other and oriented at the acute angle relative to the beam axis.

15. The particle accelerator assembly of claim 13 wherein the first window is removably connected to the holder body.

16. The particle accelerator assembly of claim 13 wherein the second window is integrally formed in the holder body.

17. The particle accelerator assembly of claim 13, wherein the liquid-target retaining assembly further includes a window support structure mounted to the liquid-target holder to support the second window.

18. The particle accelerator assembly of claim 10 wherein the mounting portion includes a connector flange releasably attached to the cyclotron's output portion, and an adapter flange coupled to the connector flange, the adapter flange having the mounting surface thereon, the connector flange and adapter flange having a beam channel therein in alignment with the beam axis, the beam channel extending through the mounting surface and being in alignment with the target cavity.

19. The particle accelerator assembly of claim 10 wherein the holder body includes a target inlet port and target outlet port in fluid communication with the target cavity.

20. A particle accelerator assembly usable to produce a radioisotope from a liquid target, comprising:

a particle accelerator configured to produce a particle beam along a beam axis;

a liquid-target retaining assembly connected to the particle accelerator, the liquid-target retaining assembly having:

a mounting portion coupled to the particle accelerator, the mounting portion having a portion configured to receive the particle beam therethrough; and a liquid-target holder connected to the mounting portion, the liquid-target holder having a holder body with a target cavity therein sized to contain the liquid target therein, the target cavity having a longitudinal axis oriented at an acute angle relative to the particle beam, the target cavity having a first depth along an axis perpendicular to the longitudinal axis, and having a projected depth along the beam axis greater than the first depth, the holder body being a chemically inert material unreactive with the liquid target, the radioisotope, or a reaction byproduct from the irradiation of the liquid target.

21. The particle accelerator assembly of claim 20 wherein the liquid-target retaining assembly further includes a cooling block removably mounted to the liquid-target holder and positioned to allow heat to be drawn away from the liquid target and the holder body.

22. The particle accelerator assembly of claim 20 wherein the liquid-target holder includes first and second windows defining opposing sides of the target cavity, the first and second windows being spaced apart from each other by a distance corresponding to the first depth.

23. The particle accelerator assembly of claim 22 wherein oriented at the acute angle relative to the beam axis.

24. The particle accelerator assembly of claim 22 wherein the first window is removably connected to the holder body.

25. The particle accelerator assembly of claim 22 wherein the second window is integrally formed in the holder body.

26. The particle accelerator assembly of claim 22 wherein the liquid-target retaining assembly further includes a window support structure mounted to the liquid-target holder to support the second window.

27. The particle accelerator assembly of claim 20 wherein the mounting portion includes a mounting surface defining a plane oriented at the acute angle relative to the beam axis, and the liquid-target holder is mounted to the mounting surface.

28. A particle accelerator assembly usable to produce a radioisotope from a liquid target, comprising:

a particle accelerator having an output portion positioned to allow a particle beam to move therethrough along beam axis; and a liquid target retaining assembly having:

a connector flange removably connected to the particle accelerator's output portion, the connector flange having a first beam channel therethrough positioned in alignment with the beam axis and positioned to receive the particle beam therethrough;

an intermediate flange securely fastened to the connector flange, the intermediate flange having a second beam channel substantially in axial alignment with the first beam channel and in alignment with the beam axis, the intermediate flange having vacuum window positioned between the first and second beam apertures, the intermediate flange having an inlet port connectable to a cooling-fluid source and having an outlet nozzle in fluid communication with the inlet port and positioned to direct a flow of cooling fluid against the vacuum window;

an adapter flange connected to the intermediate flange and having third beam channel therein in substantial axial alignment with the second beam channel and in alignment with the beam axis, the adapter flange having a mounting surface defining a plane oriented at an acute angle relative to the beam axis, the third beam channel forming a beam aperture in the mounting surface through which the particle beam can pass, the adapter flange having a vacuum port and a second inlet port in communication with the third beam aperture, the vacuum port being connectable to a vacuum source to cause a partial vacuum within the second and third beam apertures, and the second inlet port being connectable to a cooling fluid source, the second inlet port having a second outlet port in fluid communication with the third beam aperture and positioned to direct a second flow of cooling fluid toward the mounting surface;

a liquid-target holder releasably mounted to the mounting surface of the adapter flange, the liquid-target holder having a holder body with a target cavity therein sized to contain the liquid target therein to be irradiated by the particle beam, the liquid-target holder having spaced apart first and second windows connected to the holder body substantially parallel to each other and defining opposing sides of the target cavity, the first window extending across the beam aperture in the adapter flange, the target cavity having a longitudinal axis oriented at the acute angle relative to the particle beam, the first and second windows being separated by selected distance to provide a projected thickness of the liquid target in the target cavity along the beam axis is sufficient to prevent the particle beam from passing fully therethrough, the holder body being a chemically inert material relative to the liquid target, the radioisotope, or a reaction byproduct from the irradiation of the liquid target, the liquid-target holder having a target inlet port and a target outlet port in fluid connection with the target cavity for filling or emptying the target cavity, the liquid-target holder having a receiving aperture formed therein adjacent to the second window; and a cooling block mounted to the liquid-target holder, the cooling block have a support portion positioned in the receiving aperture in the target holder, and the support portion having a plurality of support ribs engaging the second window, the support ribs being spaced apart from each other to form at least one cooling channel adjacent to the second window, the cooling block having cooling fluid inlet and outlet ports in fluid communication with the cooling channel and coupleable to a cooling fluid source to provide a flow of cooling fluid into the cooling block and through the cooling channel to draw heat away from the second window during the irradiation process.

29. The particle accelerator assembly of claim 28 wherein the inert material of the holder body is niobium.

30. The particle accelerator assembly of claim 28 wherein the second window is integrally connected to the holder body.

31. The particle accelerator assembly of claim 28 wherein the first window is removably connected to the holder body.

32. The particle accelerator assembly of claim 28 wherein the acute angle of the mounting surface relative to the particle beam is in the range of approximately 10 to 50 degrees, inclusive.

33. The particle accelerator assembly of claim 28 wherein the acute angle of the mounting surface relative to the particle beam is approximately 30 degrees.

34. The particle accelerator assembly of claim 28 wherein the axis of the target cavity relative to the particle beam is in the range of approximately 20 to 40 degrees, inclusive.

* * * * *